United States Patent [19]

Miki et al.

[11] 4,373,749
[45] Feb. 15, 1983

[54] SEAT BELT RETRACTOR

[75] Inventors: Hiroyuki Miki; Hideoki Matsuoka, both of Yokohama, Japan

[73] Assignee: Nissan Motor Co., Ltd., Yokohama, Japan

[21] Appl. No.: 203,930

[22] Filed: Nov. 4, 1980

[30] Foreign Application Priority Data

Nov. 10, 1979 [JP] Japan .................. 54-156050[U]

[51] Int. Cl.³ ............................................. A62B 35/00
[52] U.S. Cl. ............................................ 280/807; 280/808
[58] Field of Search ............... 280/804, 801, 802, 808, 280/807; 297/469, 475, 476

[56] References Cited

U.S. PATENT DOCUMENTS 2,814,504  11/1957  Campbell ...................... 297/475 X

FOREIGN PATENT DOCUMENTS

| | | |
|---|---|---|
| 2354803 | 8/1974 | Fed. Rep. of Germany . |
| 7422652 | 7/1975 | Fed. Rep. of Germany . |
| 2545890 | 4/1977 | Fed. Rep. of Germany . |
| 2330210 | 12/1977 | Fed. Rep. of Germany . |
| 362235 | 6/1966 | France . |
| 2233677 | 1/1975 | France . |
| 2331351 | 6/1977 | France . |
| 2341343 | 11/1977 | France . |
| 49-203930 | 2/1974 | Japan . |
| 50-57118 | 5/1975 | Japan . |
| 52-110128 | 8/1977 | Japan . |
| 978505 | 12/1954 | United Kingdom . |
| 1247672 | 9/1971 | United Kingdom . |
| 1367248 | 9/1974 | United Kingdom . |
| 1447828 | 9/1976 | United Kingdom . |
| 1527295 | 10/1978 | United Kingdom . |
| 1531415 | 11/1978 | United Kingdom . |

*Primary Examiner*—Robert R. Song
*Attorney, Agent, or Firm*—Thompson, Birch, Gauthier & Samuels

[57] ABSTRACT

A seat belt retractor including guide means for maintaining the two seat belts smooth and twist-free. The guide means has two guiding portions extending upwardly and angled towards each other like the sides of an isosceles triangle. The guiding portions optionally have pivot means at their central portions permitting automatic repositioning to accommodate passenger movements. The retractor causes the belts to retract smoothly and without jamming or twisting.

3 Claims, 5 Drawing Figures

SEAT BELT RETRACTOR

BACKGROUND OF THE INVENTION

The present invention relates to a seat belt device for retaining human passengers, and relates in particular to a seat belt retractor having a casing provided at a central portion of a vehicle body floor, the casing being equipped with a pair of winding shafts therein on which two seat belts are rolled.

FIGS. 1 and 2 show such a type of prior art seat belt device including a retractor R having a casing 1 fixed a central portion of a vehicle body floor F. The casing 1 is equipped with a pair of winding shafts 3 each winding thereon the webbing 2a of a seat belt 2. The retractor R is attached to a center console 5 fixed between the driver's seat 4 and the adjacent passenger's seat (not shown). The webbings 2a of the two seat belts 2 extend through the vertical slots 5a which are formed in the front portion of the center console 5.

The webbings 2a, 2a of the seat belts 2, 2 are pulled in parallel from the winding shafts in the prior art retractor R, as shown in FIG. 2, the upper end of each seat belt 2 is connected to a slider 6b sliding forwardly or backwardly along a guide rail 6a at the side of the roof 6 in response to the opening and closing of a door 40. Thus, the upper edge of the webbing 2a has a tendency to become sloppy and slack near the winding shaft 3, which may prevent smooth winding of the webbing 2a onto the winding shaft 3.

In order to avoid such winding problems, the retractor R can be inclined with respect to the vehicle body floor F in such a way that the seat belts 2 can better fit on the passengers. However, in such a case, more space in the console is required.

SUMMARY OF THE INVENTION

According to the present invention, a seat belt retractor includes guide means associated two winding shafts so that two seat belts can smoothly retain human passengers. The guide means includes two guiding portions placed along the upper sides of an isosceles triangle, respectively. For example, the retractor includes a channel-shaped casing having the upper, lower and rear walls in which the two winding shafts are provided in a conventional manner, and the base side of the triangle is positioned along the lower wall of the casing. The guide means is preferably made of a wire material to form the two guiding portions as above-stated. For example, the whole of the guide means can be a triangle, and the bottom thereof is fixed to the front of the lower wall of the casing. Also, the guide means can have a slot through which the seat belt can pass. In such a case, the guide means can be fixed at its lower end portion to the casing, or at its intermediate portion pivotally to the casing.

Accordingly, an object of the present invention is to provide a seat belt device for a passenger car which can overcome the defects of the prior art as above-stated.

A further object of the present invention is to provide a seat belt retractor in which the upper edge of the webbing of a seat belt does not slack even if it is largely inclined with respect to a winding shaft.

Another object of the present invention is to provide a seat belt retractor which can guide a seat belt in such a manner that the seat belt can fit on a passenger in its best position.

BRIEF DESCRIPTION OF THE DRAWINGS

These and other objects, features and advantages of the present invention will become more apparent from the following description of preferred embodiments thereof when read in conjunction with the accompanying drawings in which.

DETAILED DESCRIPTION OF THE PREFERRED EMBODIMENTS

Figure 1:
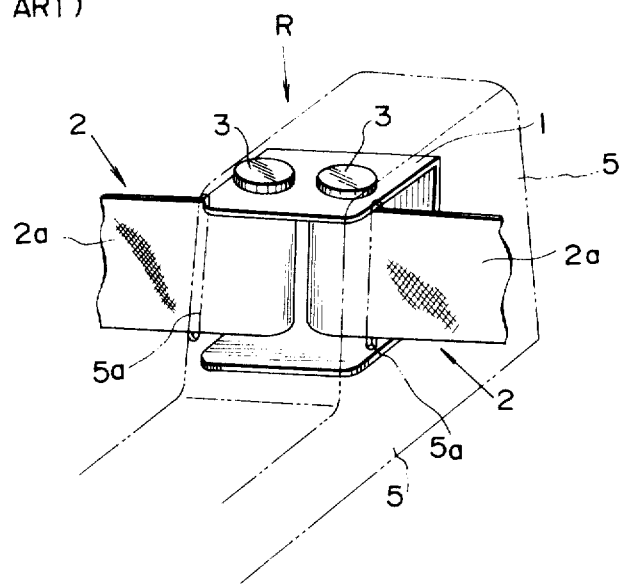
FIG. 1 is a perspective view showing a prior art seat belt retractor for a passenger car.

Referring now to the drawings, three embodiments of the present invention will be described in detail. Like parts are designated by corresponding reference numbers throughout FIGS. 1 to 5.

Figure 2:
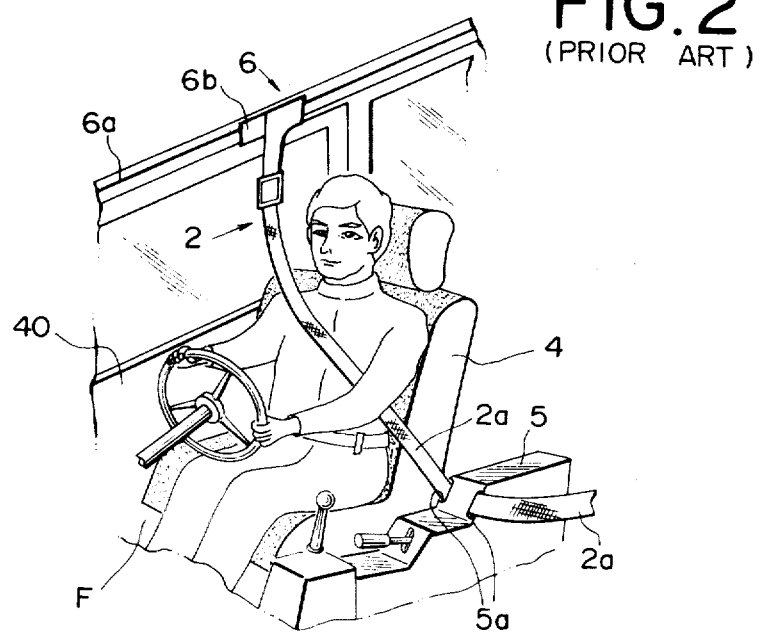
FIG. 2 shows a prior art seat belt device equipped with the seat belt retractor shown in FIG. 1.
Figure 3:
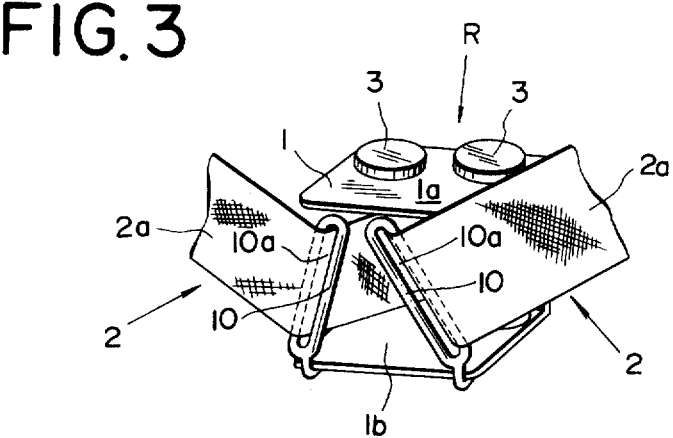
FIG. 3 is a perspective view showing a seat belt retractor according to a preferred embodiment of the present invention.

In FIG. 3, a sudden pull-locking type seat belt retractor R is mounted in a center console as shown in FIGS. 1 and 2. The center console is located above the central portion of a vehicle body floor. The retractor R includes a casing 1 which is formed in a channel shape and has an open front portion and upper, lower and rear walls. Two winding shafts 3, 3 are placed between the upper and lower walls 1a, 1b of the casing 1. The webbing 2a of a seat belt 2 is wound on each of the winding shafts 3.

A pair of guide means 10 are attached at the front portion of the casing 1 to guide the seat belts 2 in cooperation with the winding shafts 3, 3 so that the seat belts 2 can smoothly fit around and retain the passengers. Each guide means 10 includes a guiding portion which supports and guides the webbing 2a of the seat belt 2. The two guiding portions are preferably oriented to form the upper sides of an isosceles triangle. In other words, the two guiding portions are positioned along the legs of an inverted "V". The upper portions of the guiding portions may be tipped forwardly or rearwardly in order to smoothly orient the seat belts toward the passengers. The guiding portions are round in cross-section. The guide means 10 is preferably a ring member made of a wire material, having a circular cross-section.

In the embodiment of FIG. 3, the guide means 10 is an elongate ring having a slot 10a therein through which the webbing 2a of the seat belt 2 can slidably pass. The various surfaces of the elongate ring are used as the guiding portion of the guide means 10. The lower portion of the elongate ring 10 is fixed to the lower wall 1b of the casing 1.

The upper end of the seat belt 2 is connected to the slider 6b provided at the side of the roof 6 of the passenger compartment as shown in FIG. 2 to form a passive seat belt.

In operation, the webbing 2a of the seat belt 2 wound on the winding shaft 3 extends through the slot 10a of the guiding means 10 and is guided by the guiding portion of the guide means 10 so as to smoothly pass around the passenger and to remain straight and free of twisting.

Figure 4:
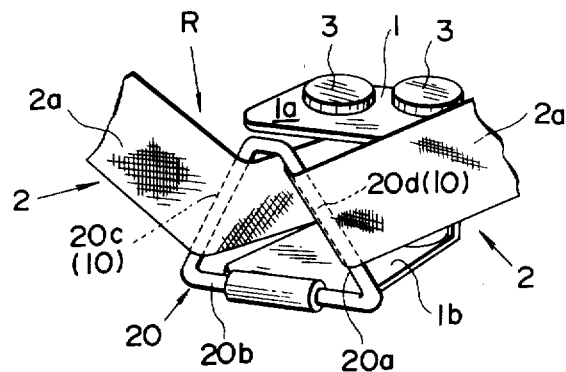
FIG. 4 is a perspective view showing a seat belt retractor according to an alternative embodiment of the present invention.

FIG. 4 shows an alternative embodiment of the present invention. The guide means 20 is a triangular ring made of a wire material having a circular cross-section. The upper sides of the triangular ring function as the two primary elements of the two guiding portions of the guide means 20. The triangular ring 20 has a triangular opening 20a. The base side 20b of the triangular ring 20 is fixed to the front portion of the lower wall 1b of the casing 1. The other sides 20c, 20d of the triangular ring 20 are slightly longer than the width of the webbing 2a of the seat belt 2. The webbing 2a of the seat belt 2 slides over the inner round surface of the triangular ring 20, to be guided thereby.

The upper portion of the triangular guide ring may be tipped rearwardly or forwardly so as to smoothly orient each seat belt 2 toward each passenger. The guiding direction provided by the guide means can be adjusted by changing the fluid inclination angle of the guide ring 20 and by changing the length of the base side 20b thereof.

According to the embodiment shown in FIG. 4, only one triangular ring is used as the guiding means 20 so that the construction thereof is extremely simple. The production costs thereof can be remarkably decreased.

In place of the triangular ring, a plate having a triangular opening therein can be used as the guide means, and the side edges thereof are used as the primary elements of the two guiding portions each having a round surface for smoothly guiding the webbing 2a of the seat belt 2.

Figure 5:
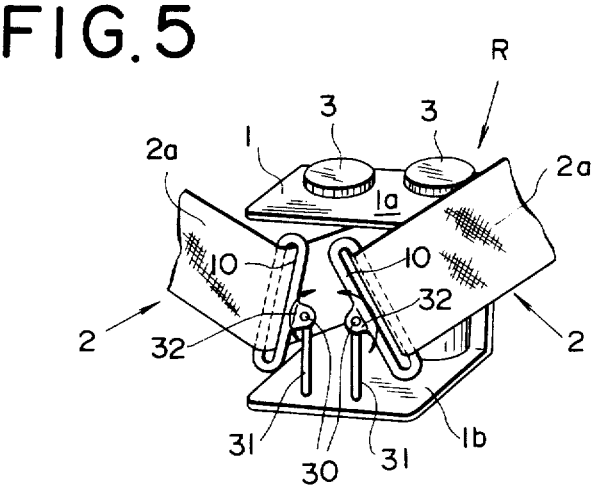
FIG. 5 is a perspective view showing a seat belt retractor according to another alternative embodiment of the present invention.

FIG. 5 shows another alternative embodiment of the present invention. The guide means includes two elongate rings 10 each having a slot 10a therein. The two elongate rings 10 are pivotally supported at their central portions 32 by multi-directional pivot means 30 fixed to the upper ends of supporting members 31, 31 respectively. The lower ends of the supporting members 31 are fixed near the front portion of the lower wall 1b of the casing 1.

According to this embodiment in FIG. 5, each guide means 10 can rotate or pivot around the upper end of each supporting member 31 so that the webbing 2a of the seat belt 2 is guided always in the best direction for smoothly passing around the passenger and for remaining straight and twist-free. Accordingly, if the seat 4 is adjusted forwardly or backwardly, the seat belt guide means will automatically pivot to its optimal position.

In the embodiments shown and described, the upper portion of the guide means may be inclined forwardly because the seat belt 2 is used as a shoulder belt. However, the upper portion of the guide means may be inclined rearwardly when the seat belt is used as a waist belt.

The seat belt retractor R according to the present invention can be used with a sudden pull-locking type device as well as other types.

As can be seen from the foregoing, according to the present invention, guide means having two guide portions specially designed to operate in association with two winding shafts can guide the webbings of two seat belts for two adjacent passengers to retain them always in the best position. For example, the upper edge of the webbing of the seat belt does not slack or twist. Smooth operation of the winding shafts can be obtained. When the seat belt retractor used in the sudden pull locking type, the load exerted to the seat belt in a car crash is received by the whole width of the webbing of the seat belt so that the seat belt can safely retain the passenger without any possibility of the seat belt's being broken.

What is claimed is:

1. For use in an automotive vehicle having a vehicle body floor, a seat belt retractor including:
   a retractor casing provided at the approximate center of the vehicle body floor;
   a pair of seat belts adapted to retain two adjacent passengers, each of the seat belts having a webbing;
   a pair of winding shafts mounted vertically in the casing for winding the pair of webbings; and
   improved guide means for guiding the webbing smoothly and free of twisting towards and away from the winding shafts, said improved guide means comprising:
   a pair of elongate rings each having a slot therein through which a webbing passes in its travel towards and away from a winding shaft, said pair of elongate rings having a pair of guiding portions forming the upper equal sides of an isosceles triangle for slidably guiding the pair of webbings; and
   means in the casing for pivotally supporting the intermediate portion of each elongate ring, each said ring pivoting in response to the forces applied by the sliding webbing and thereby maintaining each webbing smooth and twist-free.

2. The retractor of claim 1 wherein the pivotally supporting means includes a pair of support members on which the intermediate portions of the pair of elongate rings are pivotally supported with respect to the casing.

3. For use in an automotive vehicle having a vehicle body floor, a seat belt retractor including:
   a retractor casing provided at the approximate center of the vehicle body floor;
   a pair of seat belts adapted to retain two adjacent passengers, each of the seat belts having a webbing;
   a pair of winding shafts mounted vertically in the casing for winding the pair of webbings; and
   improved guide means for guiding the webbing smoothly and free of twisting towards and away from the winding shafts, said improved guide means comprising:
   an isosceles triangular ring made of an endless continuous length of wire having a round cross-section, said ring having upper equal sides forming two guiding portions over which the two webbings slidably pass in their travel towards and away from the two winding shafts; and
   means in the casing engaging the lower side of the triangular ring for adjustably fixing the plane of the triangular ring at selected angles relative to the vertical plane of the pair of winding shafts.

* * * * *